UNITED STATES PATENT OFFICE.

ROBERT E. SCHMIDT, OF ELBERFELD, GERMANY, ASSIGNOR TO THE FARBEN-FABRIKEN, VORMALS FR. BAYER & CO., OF SAME PLACE.

ALIZARINE DERIVATIVE.

SPECIFICATION forming part of Letters Patent No. 446,893, dated February 24, 1891.

Application filed October 31, 1890. Serial No. 369,979. (No specimens.)

*To all whom it may concern:*

Be it known that I, ROBERT E. SCHMIDT, doctor of philosophy, chemist, and assignor to THE FARBENFABRIKEN, VORMALS FR. BAYER & CO., a subject of the Emperor of Germany, residing at Elberfeld, Germany, have invented a new and useful Improvement in the Manufacture of a New Alizarine Derivative Called Alizarine Bordeaux, of which I give in the following a clear and exact description.

My invention relates to the manufacture of a new alizarine derivative called "alizarine bordeaux" for dyeing cotton, wool, and silk mordanted with chromium or alumina salts by oxidizing alizarine with a large excess of sulphuric anhydride in the form of a fuming sulphuric acid of high percentage at a low temperature.

First an intermediate product, insoluble in water, the neutral sulphuric ether of the alizarine bordeaux is formed, which by several methods of treatment leads to the alizarine bordeaux, totally different from alizarine. This conversion is most quickly and conveniently performed by dissolving the product in boiling diluted soda-lye and decomposing it with hydrochloric acid or boiling it directly with diluted sulphuric acid.

In carrying out my process practically I proceed as follows: Ten pounds of ground and highly-dried alizarine are introduced into one hundred pounds of fuming sulphuric acid containing seventy per cent. of anhydride with the precaution to avoid great rise of temperature. The mixture is maintained at from about 35° to 40° centigrade for from about twenty-four to thirty-six hours until a sample poured into ice-water and immediately saturated with soda-lye gives a yellowish-red solution. The mixture is poured into two hundred pounds of sulphuric acid of 66° Baumé and then into two thousand pounds of water. The deposit is filtered off, dissolved by boiling with soda-lye in two thousand pounds of water, and the boiling solution precipitated with hydrochloric acid. The thus-formed yellowish-red precipitate is my new product, which after filtering and washing may be employed directly in the form of a paste for dyeing or printing purposes. The reaction that here takes place is a peculiar and novel one, the fuming sulphuric acid acting as an oxidizing agent by forming tetraoxyanthraquinone, and being itself reduced to sulphurous acid. In the first place, however, a sulphuric-acid ether of the tetraoxyanthraquinone is formed, being the intermediate product above described, which on boiling with acids is converted into the tetraoxyanthraquinone and sulphuric acid.

My new product thus obtained, and called "alizarine bordeaux," is a reddish-yellow precipitate which dyes cotton mordanted in the known Turkey-red manner with alumina mordants, a bordeaux, and with chromium mordants a blue violet. Insoluble in water it dissolves very easily in soda-lye with the same red-violet color as alizarine, but distinguished from it by its solution in concentrated sulphuric acid, which is not reddish-brown, but blue violet. In glacial acetic acid it is soluble with great difficulty, but crystallizes from it in garnet-red needles which do not melt at 280° centigrade. A better solvent than glacial acetic acid to crystallize my new product is nitro-benzole, which dissolves my alizarine bordeaux very easily. By analyzing the fine crystallized product results are obtained which show that it has the same chemical composition as tetraoxyanthraquinone $C_{14}H_8O_6$.

Having thus described my invention, what I claim as new, and desire to secure by Letters Patent, is—

1. The process for producing the coloring-matter herein described by oxidizing alizarine with fuming sulphuric acid, which process consists in treating dried alizarine (dioxyanthraquinone) with large quantities of fuming sulphuric acid of a high percentage of anhydride at a low temperature, pouring the melt on ice, and filtering the intermediate product, the yellowish-brown deposit formed, dissolving the same in soda-lye, and adding diluted mineral acid to the boiling solution, from which the coloring-matter is precipitated.

2. The coloring-matter hereinbefore described, derived from alizarine, which is a yellowish-red paste insoluble in water, easily soluble in soda-lye and in concentrated sulphuric acid with a blue-violet color, and crystallizing from glacial acetic acid or nitro-benzole in garnet-red needles which do not melt at 280° centigrade; it has the following composition: $C_{14}H_8O_6$.

ROBERT E. SCHMIDT.

Witnesses:
 WM. A. POLLOCK,
 C. R. FERGUSON.